United States Patent
Liao

(10) Patent No.: US 6,907,676 B2
(45) Date of Patent: Jun. 21, 2005

(54) STRENGTHENED BLADE TAPE MEASURE

(76) Inventor: Huei-Yen Liao, No. 14, Lane 83, Hua-Cheng Road, Hsin-Chuang City (TW)

( * ) Notice: Subject to any disclaimer, the term of this patent is extended or adjusted under 35 U.S.C. 154(b) by 0 days.

(21) Appl. No.: 10/633,393

(22) Filed: Jul. 31, 2003

(65) Prior Publication Data

US 2005/0022412 A1 Feb. 3, 2005

(51) Int. Cl.$^7$ ................................................ G01B 3/10
(52) U.S. Cl. .................................... 33/757; 33/755
(58) Field of Search ........................ 33/755, 757, 759, 33/760, 771

(56) References Cited

U.S. PATENT DOCUMENTS

| | | | | |
|---|---|---|---|---|
| 4,429,462 A | * | 2/1984 | Rutty et al. | 33/757 |
| 4,459,753 A | * | 7/1984 | Nagasawa et al. | 33/771 |
| 6,324,769 B1 | * | 12/2001 | Murray | 33/755 |
| 6,367,161 B1 | * | 4/2002 | Murray et al. | 33/757 |
| 6,473,986 B1 | * | 11/2002 | Sun | 33/757 |
| 6,643,947 B2 | * | 11/2003 | Murray | 33/755 |
| 6,662,463 B2 | * | 12/2003 | Lee | 33/757 |

* cited by examiner

*Primary Examiner*—Christopher W. Fulton
*Assistant Examiner*—Madeline Gonzalez
(74) *Attorney, Agent, or Firm*—Raymond Y. Chan; David and Raymond

(57) ABSTRACT

A strengthened blade tape measure includes a tape casing, a retraction unit, and a ruler blade, having an inner end attached to the retraction unit and an outer end stopped at a guiding opening of the tape casing, adapted to slidably fold between a storage position and a measuring position. In which, at the storage position, the ruler blade is retracted to receive in the tape casing in a coil flattened configuration manner via the retraction unit, and at the measuring portion, the outer end of the ruler blade is slidably pulled to extend the ruler blade in a concave-convex configuration out of the tape casing through the guider opening, wherein the ruler blade is capable of standing out from the tape casing with a measuring length at least 10 feet in a self-sustaining manner so as to prevent the ruler blade from buckling by its own weight.

13 Claims, 4 Drawing Sheets

| Set 1 | |
|---|---|
| H | 11.34mm |
| W | 41.27mm |
| W1 | 32.11mm |
| H1 | 3.85mm |
| R1 | 15mm |
| α | 84 degrees |
| W2 | 20.07mm |
| R2 | 30mm |
| θ | 18.43 degrees |
| T | 0.2mm |

| Set 2 | |
|---|---|
| H | 11.03mm |
| W | 41.29mm |
| W1 | 32.94mm |
| H1 | 3.85mm |
| R1 | 15mm |
| α | 84 degrees |
| W2 | 20.07mm |
| R2 | 45mm |
| θ | 12.5 degrees |
| T | 0.2mm |

| Set 3 | |
|---|---|
| H | 9.75mm |
| W | 41.29mm |
| W1 | 34.91mm |
| H1 | 3.62mm |
| R1 | 18mm |
| α | 74 degrees |
| W2 | 21.67mm |
| R2 | 45mm |
| θ | 11.5 degrees |
| T | 0.2mm |

Fig. 5

STRENGTHENED BLADE TAPE MEASURE

BACKGROUND OF THE PRESENT INVENTION

1. Field of Invention

The present invention relates to a tape measure, and more particularly to a strengthened blade retractable tape measure, wherein the ruler blade, having a predetermined curvature, is adapted to rigidly extend at least 10 feet from the tape casing in a self-sustaining manner without buckling by its own weight, so as to substantially lengthen the measuring distance along the measuring blade.

2. Description of Related Arts

Retractable tape measures have been commonly used in commercial. A conventional retractable tape measure generally comprises a tape casing, a retractable reel assembly rotatably supported in the tape casing, and a ruler blade having an inner end attached to the retractable reel assembly such that the ruler blade is adapted to fold in the tape casing in a coil manner and to extend from the tape casing for length measuring purpose.

There are two major features of the retractable tape measure for professional use, especially for construction. One of the features of such retractable tape measure is to provide the ruler blade having a predetermined length to lengthen the measuring distance along the ruler blade. Another feature of the retractable tape measure is to provide the ruler blade that the ruler blade must be rigid enough to self-sustaining manner when the ruler blade is extended from the tape casing. Therefore, the user is able to self-operate the retractable tape measure to measure the distance. In other words, the size and the weight of the retractable tape measure is not the most important concern for the professionals.

In order to accomplish the above features of the retractable tape measure, the dimension of the ruler blade must be configured. The width of the ruler blade can be substantially increased for enhancing the self-sustaining support of the ruler blade. However, the length of the ruler blade will be shortened to remain the weight thereof constantly. Alternatively, the curvature of the ruler blade can be increased to enhance the self-sustaining ability thereof. However, the ruler blade cannot be smoothly retracted back to the tape casing.

Accordingly, U.S. Pat. No. 6,324,769, owned by Murray, generally suggests a tape measure comprising a ruler blade having a width in the flattened configuration thereof having a dimension within the range of 1.10"–1.5", a height in the concave-convex configuration thereof having a dimension within the range of 0.25"–0.40", and a thickness in either configuration thereof having a dimension within the range of 0.0045"–0.0063", such that the ruler blade is capable of standing out from the tape casing with a measuring length at least 10.5 feet. Therefore, the modification and improvement of the ruler blade should be considered as one of the important subject matter of the retractable tape measure to enhance the practice use thereof.

SUMMARY OF THE PRESENT INVENTION

A main object of the present invention is to provide a strengthened blade tape measure, wherein the ruler blade, having a predetermined curvature, is adapted to rigidly extend at least 10 feet from the tape casing in a self-sustaining manner without buckling by its own weight, so as to substantially lengthen the measuring distance along the measuring blade.

Another object of the present invention is to provide a strengthened blade tape measure, wherein the curvature of the ruler blade does not affect the retraction operation of the tape measure via the retraction unit such that the ruler blade with its curvature is adapted to smoothly slide out from the tape casing for measuring purpose and to smoothly slide back to the tape casing for storage.

Another object of the present invention is to provide a strengthened blade tape measure which does not require altering its original structural design to incorporate with the ruler blade so as to minimize the manufacturing cost of the tape measure. In other words, the ruler blade is adapted to incorporate the conventional tape casing without altering the original structure thereof.

Another object of the present invention is to provide a strengthened blade tape measure, wherein no expensive or complicated structure is required to employ in the present invention in order to achieve the above mentioned objects. Therefore, the present invention successfully provides an economic and effective solution not only for providing a rigid configuration to support the ruler blade in a self-sustaining manner but also for enhancing the measuring distance of the ruler blade extending out from the tape casing.

Accordingly, in order to accomplish the above objects, the present invention provides a strengthened blade tape measure, comprising:

a tape casing having a receiving cavity and a guider opening communicating with the receiving cavity;

a retraction unit supported in the receiving cavity; and a ruler blade, having an inner end attached to the retraction unit and an outer end stopped at the guiding opening, adapted to slidably fold between a storage position and a measuring position, wherein at the storage position, the ruler blade is refracted to receive in the receiving cavity in a coil flattened configuration manner via the retraction unit, and at the measuring portion, the outer end of the ruler blade is slidably pulled to extend the ruler blade in a concave-convex configuration out of the receiving cavity through the guider opening, the ruler blade having a width in the flattened configuration thereof having a dimension within the range of 41–42 mm, a height in the concave-convex configuration thereof having a dimension within the range of 9–12 mm, and a thickness thereof having a dimension at least 0.2 mm. as shown in FIG. 5, such that the ruler blade is capable of standing out from the tape casing with a measuring length at least 10 feet in a self-sustaining manner so as to prevent the ruler blade from buckling by its own weight.

These and other objectives, features, and advantages of the present invention will become apparent from the following detailed description, the accompanying drawings, and the appended claims.

BRIEF DESCRIPTION OF THE DRAWINGS

FIG. 5 illustrates the dimensions of the ruler blade and its alternative modes according to the above preferred embodiment of the present invention.

DETAILED DESCRIPTION OF THE PREFERRED EMBODIMENTS

Figure 1:
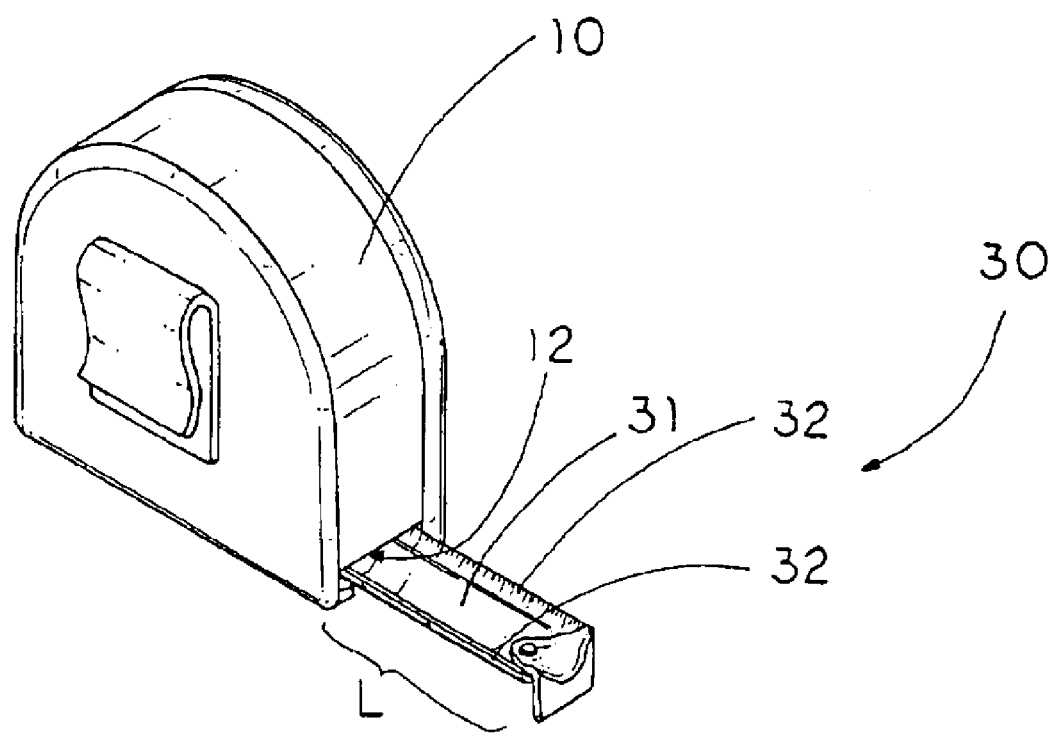
FIG. 1 is a perspective view of a strengthened blade tape measure according to a preferred embodiment of the present invention.
Figure 2:
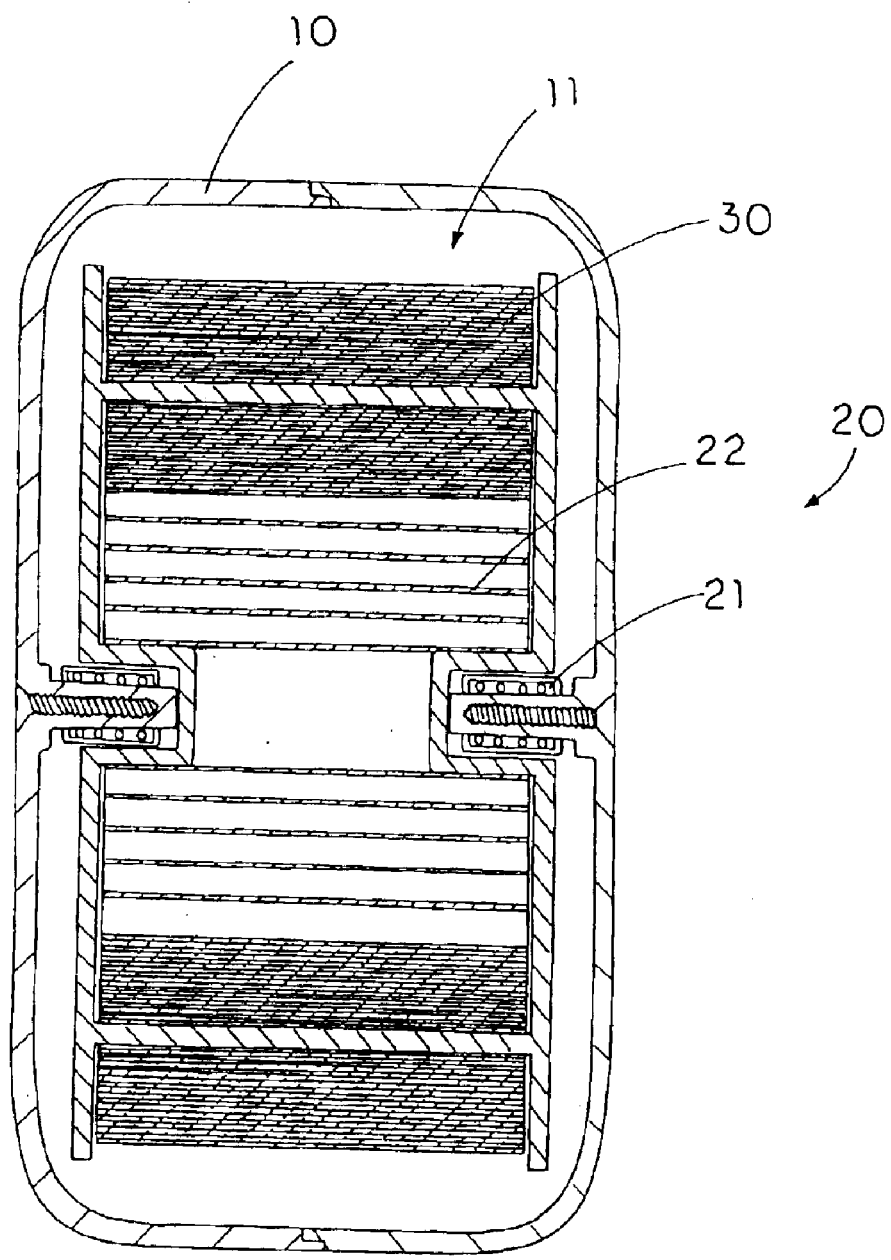
FIG. 2 is a sectional view of the strengthened blade tape measure according to the above preferred embodiment of the present invention.

Referring to FIGS. 1 and 2 of the drawings, a strengthened blade tape measure according to a preferred embodiment of the present invention is illustrated, wherein the tape measure, such as a conventional tape measure, comprises a tape casing 10 having a receiving cavity 11 and a guider opening 12 communicating with the receiving cavity 11, and a retraction unit 20 supported in the receiving cavity 11 of the tape casing 10.

The tape measure further comprises a ruler blade 30, having an inner end attached to the retraction unit 20 and an outer end stopped at the guiding opening 12, adapted to slidably fold between a storage position and a measuring position. In which, at the storage position, the ruler blade 30 is retracted to receive in the receiving cavity 11 in a coil flattened configuration manner via the retraction unit 20, and at the measuring portion, the outer end 302 of the ruler blade 30 is slidably pulled to extend the ruler blade 30 in a concave-convex configuration out of the receiving cavity 11 through the guider opening 12.

The retraction unit 20 comprises a supporting reel 21 rotatably supported in the receiving cavity 11 and a retraction element 22 coaxially mounted to the supporting reel 21 to wind up the ruler blade 30 in a coil-rolled manner about the supporting reel 21 at the storage position. Accordingly, at normal condition, the ruler blade 30 is in a concave-convex configuration that when the ruler blade 30 is extended out of the tape housing 10. At the storage position, the ruler blade 30 is retracted and pressed to flatten its shape by the retracting force of the retraction unit 20.

Figure 3:
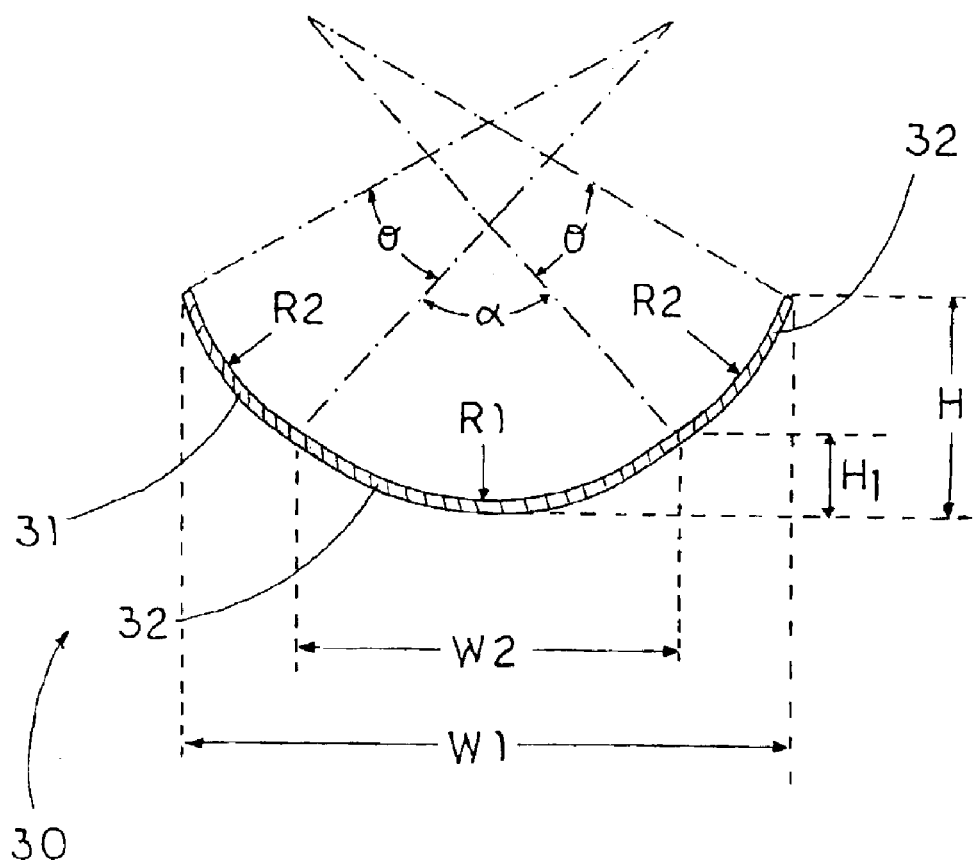
FIG. 3 illustrates the dimensions of the ruler blade of the strengthened blade tape measure in the concave-convex configuration according to the above preferred embodiment of the present invention.

According to the preferred embodiment, the ruler blade 30 has a longitudinal central portion 31 and two longitudinal side portions 32 integrally extended from two sides of the central portion 31 of the ruler blade 30 respectively, wherein each of the side portions 32 of the ruler blade 30 has a curvature smaller than a curvature of the central portion 31 of the ruler blade 30, as shown in FIG. 3. In addition, a measurement set is printed along at least one of the side portions 32 of the ruler blade 30.

The central portion 31 of the ruler blade 30 has a width $W_1$ in the concave-convex configuration thereof having a dimension within a range of 20–22 mm, a height $H_1$ in the concave-convex configuration thereof having a dimension within a range of 3–4 mm.

The ruler blade 30 has a width W in the flattened configuration thereof having a dimension within the range of 41–42 mm, a height H in the concave-convex configuration thereof having a dimension within the range of 9–12 mm, and a thickness T thereof having a dimension at least 0.2 mm, as shown in FIG. 5, such that the ruler blade 30 is capable of standing out from the tape casing 10 with a measuring length L at least 10 feet in a self-sustaining manner so as to prevent the ruler blade 30 from buckling by its own weight. In addition, the width $W_1$ of the ruler blade 30 in the concave-convex configuration has a dimension within the range of 32–35 mm.

The central portion 31 of the ruler blade 30 has a width $W_2$ in the concave-convex configuration thereof having a dimension within the range of 20–22 mm, a height $H_1$ in the concave-convex configuration thereof having a dimension within the range of 3–4 mm.

Figure 4:
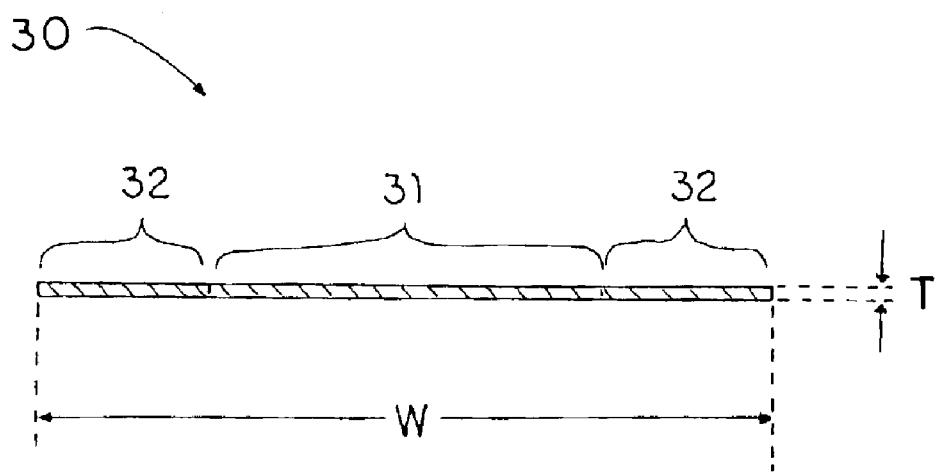
FIG. 4 illustrates the dimensions of the ruler blade of the strengthened blade tape measure in the flattened configuration according to the above preferred embodiment of the present invention.

As shown in FIGS. 3 and 4, the dimensions of the ruler blade 30 are illustrated that the width W of the ruler blade 30 in the flattened configuration is 41.27 mm and the height H in the concave-convex configuration thereof is 11.34 mm. In addition, the width $W_1$ of the ruler blade 30 in the concave-convex configuration is 32.11 mm.

According to the preferred embodiment, the curvature of the central portion 31 of the ruler blade 30 is defined that the central projecting radius $R_1$ of the central portion 31 of the ruler blade 30 is 15 mm and the central projecting angle α of the central portion 31 of the ruler blade 30 is 84°. In addition, the width $W_2$ of the central portion 31 of the ruler blade 30 in the concave-convex configuration is 20.07 mm and the height $H_1$ of the central portion 31 of the ruler blade 30 in the concave-convex configuration is 3.85 mm.

The curvature of each of the side portion 32 of the ruler blade 30 is defined that the side projecting radius $R_2$ of the side portion 32 of the ruler blade 30 is 30 mm and the side projecting angle θ of the side portion 32 of the ruler blade 30 is 18.43°.

Accordingly, the central portion 31 of the ruler blade 30 is arranged to support the ruler blade 30 in such a manner that the ruler blade 30 is adapted to stand out from the tape casing 10 with the measuring length L at least 10 feet in a self-sustaining manner so as to prevent the ruler blade 30 from buckling by its own weight. In addition, the curvature of each of the side portions 32 of the ruler blade 30 should be lesser than the curvature of the central portion 31 of the ruler blade 30 such that the measurement set printed along the respective side portion 32 of the ruler blade 30 can be easily read when the ruler blade 30 is extended to stand out from the tape casing 10.

FIG. 5 illustrates the ruler blade 30 with alternative sets of dimensions thereof such that the ruler blade 30 is capable of standing out from the tape casing 10 with a measuring length L at least 10 feet in a self-sustaining manner. The dimensions of the ruler blade 30, according to the first alternative mode, are illustrated that the width W of the ruler blade 30 in the flattened configuration is 41.29 mm and the height H in the concave-convex configuration thereof is 11.03 mm. In addition, the width $W_1$ of the ruler blade 30 in the concave-convex configuration is 32.94 mm.

The curvature of the central portion 31 of the ruler blade 30 is defined that the central projecting radius $R_1$ of the central portion 31 of the ruler blade 30 is 15 mm and the central projecting angle α of the central portion 31 of the ruler blade 30 is 84°. In addition, the width $W_2$ of the central portion 31 of the ruler blade 30 in the concave-convex configuration is 20.07 mm and the height $H_1$ of the central portion 31 of the ruler blade 30 in the concave-convex configuration is 3.85 mm.

The curvature of each of the side portion 32 of the ruler blade 30 is defined that the side projecting radius $R_2$ of the side portion 32 of the ruler blade 30 is 45 mm and the side projecting angle θ of the side portion 32 of the ruler blade 30 is 12.3°.

The dimensions of the ruler blade 30, according to the second alternative mode, are illustrated that the width W of the ruler blade 30 in the flattened configuration is 41.29 mm and the height H in the concave-convex configuration thereof is 9.75 mm. In addition, the width $W_1$ of the ruler blade 30 in the concave-convex configuration is 34.91 mm.

The curvature of the central portion 31 of the ruler blade 30 is defined that the central projecting radius $R_1$ of the central portion 31 of the ruler blade 30 is 18 mm and the central projecting angle α of the central portion 31 of the ruler blade 30 is 74°. In addition, the width $W_2$ of the central portion 31 of the ruler blade 30 in the concave-convex configuration is 21.67 mm and the height $H_1$ of the central portion 31 of the ruler blade 30 in the concave-convex configuration is 3.62 mm.

The curvature of each of the side portion 32 of the ruler blade 30 is defined that the side projecting radius $R_2$ of the side portion 32 of the ruler blade 30 is 45 mm and the side projecting angle θ of the side portion 32 of the ruler blade 30 is 11.5°.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A strengthened blade tape measure, comprising:
   a tape casing having a receiving cavity and a guider opening communicating with said receiving cavity;
   a retraction unit supported in said receiving cavity; and
   a ruler blade, having an inner end attached to said retraction unit and an outer end stopped at said guider opening, adapted to slidably fold between a storage position and a measuring position, wherein at said storage position, said ruler blade is retracted to receive in said receiving cavity in a coil flattened configuration manner via said retraction unit, and at said measuring position, said outer end of said ruler blade is slidably pulled to extend said ruler blade in a concave-convex configuration out of said receiving cavity through said guider opening,
   wherein said ruler blade has a width in said flattened configuration thereof having a dimension within a range of 41–42 mm, a height in said concave-convex configuration thereof having a dimension within a range of 9–12 mm, and a thickness thereof having a dimension at least 0.2 mm, such that said ruler blade is capable of standing out from said tape casing with a measuring length at least 10 feet in a self-sustaining manner so as to prevent said ruler blade from buckling by its own weight;
   wherein said ruler blade has a longitudinal central portion and two longitudinal side portions integrally extended from two sides of said central portion of said ruler blade respectively, wherein each of said side portions of said ruler blade has a curvature smaller than a curvature of said central portion of said ruler blade, wherein said central portion of said ruler blade has a width in said concave-convex configuration thereof having a dimension within a range of 20–22 mm, a height in said concave-convex configuration thereof having a dimension within a range of 3–4 mm.

2. The strengthened blade tape measure, as recited in claim 1, wherein said curvature of said central portion of said ruler blade is defined that a central projecting radius of said central portion of said ruler blade is 15 mm and a central projecting angle of said central portion of said ruler blade is 84°, wherein said curvature of each of said side portion of said ruler blade is defined that a side projecting radius of said side portion of said ruler blade is 30 mm and a side projecting angle of said side portion of said ruler blade is 18.43°.

3. The strengthened blade tape measure, as recited in claim 1, wherein said width of said ruler blade in said flattened configuration is 41.27 mm and said height of said ruler blade in said concave-convex configuration is 11.34 mm.

4. The strengthened blade tape measure, as recited in claim 1, wherein said width of said ruler blade in said flattened configuration is 41.29 mm and said height of said ruler blade in said concave-convex configuration is 11.03 mm.

5. The strengthened blade tape measure, as recited in claim 1, wherein said width of said ruler blade in said flattened configuration is 41.29 mm and said height of said ruler blade in said concave-convex configuration is 9.75 mm.

6. The strengthened blade tape measure, as recited in claim 1, wherein said curvature of said central portion of said ruler blade is defined that a central projecting radius of said central portion of said ruler blade is 15 mm and a central projecting angle of said central portion of said ruler blade is 84°, wherein said curvature of each of said side portion of said ruler blade is defined that a side projecting radius of said side portion of said ruler blade is 45 mm and a side projecting angle of said side portion of said ruler blade is 12.3°.

7. The strengthened blade tape measure, as recited in claim 1, wherein said width of said ruler blade in said flattened configuration is 41.27 mm and said height of said ruler blade in said concave-convex configuration is 11.34 mm.

8. The strengthened blade tape measure, as recited in claim 1, wherein said width of said ruler blade in said flattened configuration is 41.29 mm and said height of said ruler blade in said concave-convex configuration is 11.03 mm.

9. The strengthened blade tape measure, as recited in claim 1, wherein said width of said ruler blade in said flattened configuration is 41.29 mm and said height of said ruler blade in said concave-convex configuration is 9.75 mm.

10. The strengthened blade tape measure, as recited in claim 1, wherein said curvature of said central portion of said ruler blade is defined that a central projecting radius of said central portion of said ruler blade is 18 mm and a central projecting angle of said central portion of said ruler blade is 74°, wherein said curvature of each of said side portion of said ruler blade is defined that a side projecting radius of said side portion of said ruler blade is 45 mm and a side projecting angle of said side portion of said ruler blade is 11.5°.

11. The strengthened blade tape measure, as recited in claim 1, wherein said width of said ruler blade in said flattened configuration is 41.27 mm and said height of said ruler blade in said concave-convex configuration is 11.34 mm.

12. The strengthened blade tape measure, as recited in claim 1, wherein said width of said ruler blade in said flattened configuration is 41.29 mm and said height of said ruler blade in said concave-convex configuration is 11.03 mm.

13. The strengthened blade tape measure, as recited in claim 1, wherein said width of said ruler blade in said flattened configuration is 41.29 mm and said height of said ruler blade in said concave-convex configuration is 9.75 mm.

* * * * *